United States Patent
Mori

(10) Patent No.: US 7,388,655 B2
(45) Date of Patent: Jun. 17, 2008

(54) HIGH-PRECISION LASER RANGEFINDER USING BURST EMISSION

(75) Inventor: Toshihiro Mori, Takatsuki (JP)

(73) Assignee: Hokuyo Automatic Co., Ltd., Osaka (JP)

( * ) Notice: Subject to any disclaimer, the term of this patent is extended or adjusted under 35 U.S.C. 154(b) by 0 days.

(21) Appl. No.: 11/723,542

(22) Filed: Mar. 20, 2007

(65) Prior Publication Data

US 2008/0088818 A1    Apr. 17, 2008

(30) Foreign Application Priority Data

Sep. 20, 2006    (JP) .............................. 2006-253833

(51) Int. Cl.
G01C 3/08    (2006.01)
(52) U.S. Cl. ......................... 356/5.1; 356/5.01; 342/127
(58) Field of Classification Search .................. 356/5.1
See application file for complete search history.

(56) References Cited

U.S. PATENT DOCUMENTS

| 5,180,992 A | 1/1993 | Akiyama et al. |
| 5,455,669 A | 10/1995 | Wetteborn |
| 2004/0135992 A1 * | 7/2004 | Munro ...................... 356/4.01 |

FOREIGN PATENT DOCUMENTS

| JP | 5-232232 | 9/1993 |
| JP | 10-020036 A | 1/1998 |
| JP | 10-069778 A | 3/1998 |
| JP | 2916780 B2 | 4/1999 |
| JP | 2000-206244 A | 7/2000 |
| JP | 2004-507742 A | 3/2004 |
| JP | 2004-219285 A | 8/2004 |
| JP | 2004-264116 A | 9/2004 |
| JP | 2006-003127 A | 1/2006 |

OTHER PUBLICATIONS

Notification of Reasons for Refusal dated Nov. 30, 2007.

* cited by examiner

*Primary Examiner*—Thomas H. Tarcza
*Assistant Examiner*—Tim Brainard
(74) *Attorney, Agent, or Firm*—Pillsbury Winthrop Shaw Pittman, LLP

(57) ABSTRACT

The present invention provides a rangefinder that has a light source for outputting a measuring beam, an AM modulation unit that modulates the measuring beam with a modulation signal, a light receiving unit that detects a reflected beam that is part of the modulated measuring beam and reflected by a measurement object, a phase difference detection unit that finds a phase difference between the measuring beam and the reflected beam, a distance arithmetic unit that calculates a distance to the measurement object based on the detected phase difference, a burst drive unit for pulse-driving the light source to operate in burst emission, and a wave position detection unit that detects a wave position based on a delay time, wherein the distance arithmetic unit calculates the distance to the measurement object based on the detected wave position and the detected phase difference.

4 Claims, 9 Drawing Sheets

HIGH-PRECISION LASER RANGEFINDER USING BURST EMISSION

CROSS REFERENCE TO RELATED APPLICATIONS

This application claims the benefit of priority of Japanese Patent Application No. 2006-253833, filed in Japan on Sep. 20, 2006. The entire contents of this application is incorporated herein by reference.

BACKGROUND OF THE INVENTION

1. Field of the Invention

The present invention relates to a rangefinder that has: a light source for outputting a measuring beam; an AM modulation unit for AM modulating the measuring beam with a modulation signal consisting of a sinusoidal wave; a light receiving unit for detecting a reflected beam that is part of the measuring beam modulated by the AM modulation unit and reflected by a measurement object; a phase difference detection unit for finding a phase difference between the measuring beam and the reflected beam; and a distance arithmetic unit for calculating a distance to the measurement object based on the phase difference detected by the phase difference detection unit.

2. Description of the Related Art

As shown in FIGS. 9A and 9B, in a laser rangefinder for measuring a distance by modulating a measuring beam outputted from a laser light source LD, irradiating it onto an object X, and detecting the reflected beam from the object X with a photodetector PD, as modulation methods of the measuring beam, two kinds of methods of the AM (Amplitude Modulation) method and the TOF (Time of Flight) method have been put into practical use. The AM method is a method where, as shown in FIG. 9A and Formula 1, the measuring beam being AM modulated with a sinusoidal wave and its reflected beam are subjected to photoelectric exchange, and the phase difference $\Delta\phi$ between these signals is calculated, and a distance is calculated from the phase difference $\Delta\phi$; the TOF method is a method where, as shown in FIG. 9B and Formula 2, the measuring beam modulated to be pulses and its reflected beam are subjected to photoelectric exchange, and a distance is calculated from a delay time $\Delta t$ between these signals. Here, L designates a distance to the object, C the velocity of light, f a modulation frequency, $\Delta\phi$ the phase difference, and $\Delta t$ the delay time.

$$L=\Delta\phi \cdot C/(4\pi \cdot f) \quad \text{[Formula 1]}$$

$$L=\Delta t \cdot C/2 \quad \text{[Formula 2]}$$

Rangefinders of this kind are used for a vision sensor of a robot and an unmanned transfer vehicle, an open/shut sensor of a door, a monitor sensor for detecting existence/absence of an intruder into a monitoring area, further a safety sensor that detects a human or an object approaching a danger apparatus and stops it safely, and the like. Moreover, such a rangefinder is used in the case of recognizing a shape of a vehicle and a shape of a human. For example, in the ETC system, it is used as a sensor for determining a type of a vehicle and counting the number of passing vehicles and as a monitoring sensor for detecting crowdedness and a flow of people by counting the number of people.

Although the AM method has a characteristic that multiple measuring points for phase difference calculation can be set up and accordingly averaging processing of distance calculation is easy, which results in a higher measurement accuracy, it presents a problem that it is impossible to measure accurate distance when the phase delay exceeds one period of the modulation frequency.

In order to cope with this problem, U.S. Pat. No. 5,180,992 discloses a technique whereby the measuring beam is modulated by mutually different three kinds of modulation frequencies and a correct distance is determined from the calculated distance values based on reflected beams corresponding to the respective frequencies. In this case, the accuracy of distance measurement is governed by a signal having the highest frequency.

On the other hand, in the TOF method, since a laser beam with a short emission pulse width is used, it has a feature that emission intensity can be set high compared with the AM method and accordingly detection sensitivity is high; therefore, it becomes possible to measure a long distance while satisfying Class 1 of International Standard for the Safety of Laser Products IEC (International Electrotechnical Commission) 60825-1.

Since in the TOF method a measuring point is only a rising edge point of the signal, it has a problem that detection accuracy is low compared with the AM method. In order to cope with this problem, U.S. Pat. No. 5,455,669 discloses a technique whereby the reflection signal is measured by using a rising edge signal and a falling edge signal of the counter of a 1.5 GHz clock signal for measurement, and thereby a distance is measured with a resolution of 3 GHz.

However, in the case where a distance is measured by the AM method in normal environment, sometimes movement of the object or scanning of the measuring beam causes abrupt variation in intensity of the reflected beam, degrading a signal waveform of the reflection signal that is subjected to photoelectric exchange by the photodetector, which generates a wave position error of shifting the measured phase by 360° or more.

Moreover, the U.S. Pat. No. 5,180,992 also poses a problem that it is necessary to irradiate measuring beams modulated with three kinds of frequencies to measure one point, which lengthens emission duration, and accordingly it is difficult to satisfy a regulation of Class 1 of Safety Standard IEC60825-1, which is intended to assure the safety of a laser beam required by the laser rangefinder adapted for general environment to the human eye.

Therefore, in practical, the AM method is used being limited to a rangefinder of a red laser that satisfies Class 2 of Safety Standard IEC60825-1 in limited environments, such as a case where a detection object made up of a retroreflector etc. is disposed in a predetermined movement area and is used to detect a travelling locus of crane equipment moving on a predetermined route.

However, in the case according to the U.S. Pat. No. 5,455,669, when performing a measurement even at 3 GHz by the TOF method, the measurement will be done only with the accuracy of a unit of 50 mm that is a distance converted from the frequency, and it is difficult to realize high-accuracy rangefinding in the order of detection accuracy 10 mm that is required in mounting a rangefinder on a robot etc. Moreover, there is also a problem that it is difficult to make a signal processing circuit for a GHz band in an ASIC (Application Specific Integrated Circuit), and also it is difficult to fabricate it in a small size because reduction in the number of parts cannot be attained.

SUMMARY OF THE INVENTION

The object of the present invention is, in view of the above-mentioned problem, to provide a rangefinder that can shorten the emission duration and can correct a wave position error while adopting the AM method.

In order to achieve the above-mentioned object, the rangefinder by the present invention has: a light source for outputting a measuring beam; an AM modulation unit for AM modulating the measuring beam with a modulation signal consisting of a sinusoidal wave; a light receiving unit for detecting a reflected beam that is part of the measuring beam modulated by the AM modulation unit and reflected by the measurement object; a phase difference detection unit for finding a phase difference between the measuring beam and the reflected beam; a distance arithmetic unit for calculating the distance to the measurement object based on the phase difference detected by the phase difference detection unit; a burst drive unit for pulse-driving the light source to operate in burst emission; and a wave position detection unit for detecting a wave position of the sinusoidal wave based on a delay time from output of the measuring beam to detection of the reflected beam, wherein the distance arithmetic unit calculates the distance to the measurement object based on the wave position detected by the wave position detection unit and the phase difference detected by the phase difference detection unit.

Moreover, it is preferable that the rangefinder according to the present invention has an AD conversion unit that converts an analog reflection signal corresponding to the reflected beam detected by the light receiving unit into a digital reflection signal with a sampling signal that is shifted in frequency from the modulation signal and comes into synchronization to a specific phase of the modulation signal once every N times, wherein the digital reflection signal as converted by the AD conversion unit is Fourier transformed to detect the phase difference by the phase difference detection unit.

Furthermore, it is preferable that the phase difference detection unit detects the phase difference by Fourier transforming a digital reflection signal as converted by the AD conversion unit that is subjected to averaging processing over a plurality of modulation periods at sampling timings for each corresponding phase in the respective period.

Still moreover, it is preferable that the rangefinder has an AD conversion unit that converts an analog reflection signal corresponding to the reflected beam detected by the light receiving unit into the digital reflection signal with the sampling signal that is shifted in frequency from the modulation signal and synchronizes with a specific phase of the modulation signal once every N times, wherein the wave position detection unit calculates average values for the digital reflection signal as converted by the AD conversion unit within one modulation period while a time is shifted by one sampling timing each time to get one average value, differential calculus is performed on an average waveform obtained by arranging the average values in time sequence, and the wave position of the sinusoidal wave is calculated based on a timing showing a position of the center of gravity of an obtained differential waveform and an output timing of the measuring beam.

Even moreover, it is preferable that the rangefinder has a determination unit that calculates average values for the digital reflection signal as converted by the AD conversion unit within one modulation period while a time is shifted by one sampling timing each time to get one average value, and determines existence/presence of disturbance based on an average waveform obtained by arranging the average values in time sequence, from its rising edge to its falling edge.

In addition, other aspects of the invention will be more apparent by referring to embodiments below.

DESCRIPTION OF THE PREFERRED EMBODIMENTS

Hereafter, examples of scanning rangefinders to which a rangefinder according to the present invention is applied will be described.

Figure 1:
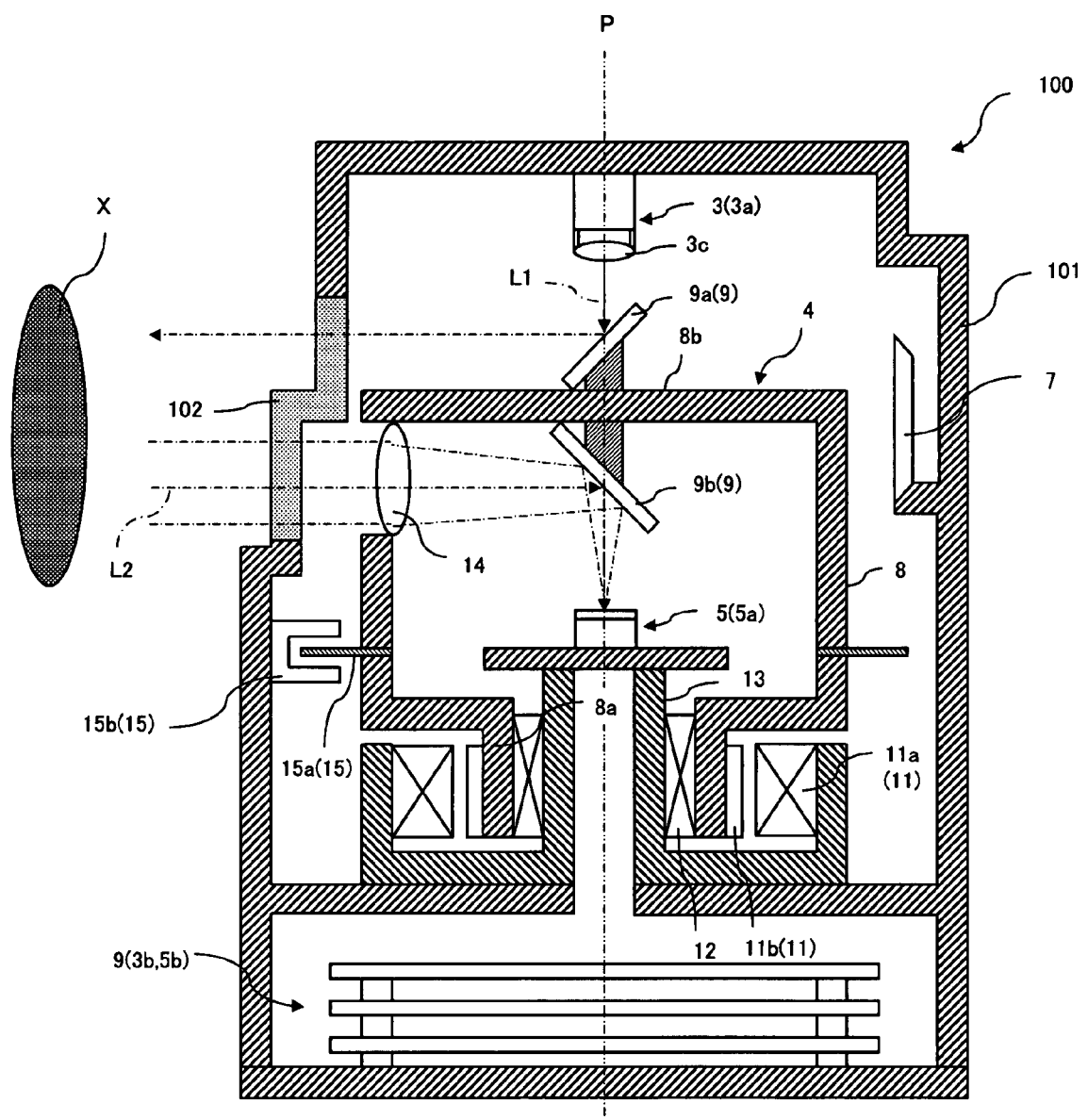
FIG. 1 is an outline longitudinal section showing the whole construction of a rangefinder according to the present invention.

As shown in FIG. 1, a scanning rangefinder 100 is constructed such that in a substantially cylindrical casing 101 covered with a light absorption member whose inner wall surface absorbs stray light, such as blackout curtains, a light projection unit 3 for outputting a measuring beam and a light receiving unit 5 for detecting a reflected beam are arranged being opposed to each other, and a scan unit 4 for scanning the measuring beam is disposed between the light projection unit 3 and the light receiving unit 5.

The scan unit 4 is equipped with a rotating body 8 rotating about a predetermined rotating shaft center P, a deflection mirror 9 rotating as one body with the rotating body 8, and a motor 11 for driving the rotating body 8 to rotate. The rotating body 8 consists of a surrounding wall 8a in the form of a cylinder whose diameter in the lower end is reduced and a top plate part 8b, and is supported rotatably by a hollow shaft 13 through a bearing 12 provided in its inner circumferential surface.

The deflection mirror 9 consists of a first deflection mirror 9a disposed on the top face of the top plate part 8b of the rotating body 8 and a second deflection mirror 9b disposed on the underside of the top plate part 8b, each being arranged with a tilt angle of approximately 45° to the rotating shaft center P.

The motor 11 consists of a rotor made up of a magnet 11b fixed to a peripheral surface of the lower end of the surrounding wall 8a being reduced in diameter and a stator made up of a coil 11a disposed on the casing side, and is configured to allow the rotating body 8 to rotate about the rotating shaft center P by interaction between the coil 11a and the magnet 11b.

A slit plate 15a having an optical slit is provided on the peripheral surface of the rotating body 8 and a photointerrupter 15b is disposed on a rotation path of the slit plate 15a, and these members constitute a scan angle detection unit 15 for detecting a scan angle of the rotating body 8.

The light projection unit 3 is constructed to have a light source 3a made up of a light emitting element using a semiconductor laser and a drive circuit 3b of the light emitting element. The light emitting element is fixedly disposed above the casing 101 so that a light axis L1 of the measuring beam outputted therefrom and the rotating shaft center P may coincide with each other. An optical lens 3c for converting the beam into a beam with a constant diameter is disposed on the optical axis L1.

The light receiving unit 5 is disposed and fixed inside the rotating body 8 so as to be opposed to the light projection unit 3 across the scan unit 4 on the rotating shaft center P, and is constructed to have a photodetector 5a made up of an avalanche photodiode for detecting the reflected beam and a light receiving circuit 5b for amplifying a reflection signal that is subjected to photoelectric exchange by a photodetector 5a.

On the surrounding wall of the casing 101, there is provided a transparent window 102 having a fixed width in the vertical direction so that the measuring beam outputted from the light projection unit 3 may be irradiated to measurement object space by the scan unit 4, and a reflected beam reflected by a measurement object X existing in the measurement object space may be detected by the light receiving unit 5.

Therefore, the measuring beam emitted from the light projection unit 3 becomes incident on the first deflection mirror 9a along the optical axis L1, is deflected to a horizontal direction, and is irradiated to the measurement object space through the transparent window 102. A reflected beam that is part of a measuring beam inputted from a horizontal direction through the transparent window 102 and reflected by the measurement object is deflected by the second deflection mirror 9b downwardly in the vertical direction and is guided to the light receiving unit 5.

Incidentally, a light receiving lens 14 for focusing the reflected beam from the measurement object onto the light receiving unit 5 is provided on an optical axis L2 along which the reflected beam is guided to the light receiving unit 5.

On a bottom of the casing 101, there is disposed a signal processing board 9 that controls rotation of the scan unit 4 and calculates a distance to the measurement object based on the reflection signal that is emitted from a light emitting element by drive and control and is detected by the light receiving unit 5.

The signal processing board 9 grasps an orientation in which the measurement object corresponding to the reflected beam exists by calculating a rotation angle of the scan unit 4 based on a pulse signal inputted from the scan angle detection unit 15.

The transparent window 102 is disposed so as to allow the measuring beam to scan in a range from approximately 180° to 270° about the rotating shaft center P. On the inner wall of the casing 101 being opposed to the transparent window 102, a prism as a light guiding member 7 for guiding reference light for correcting a distance calculated with the reflected beam is disposed.

That is, each time the scan unit 4 scans the measuring beam one time, the light receiving unit 5 detects the reference light through the light guiding member 7, and in this occasion a reference distance from the light projection unit 3 to the light receiving unit 5 inside the rangefinder is calculated.

Figure 2:
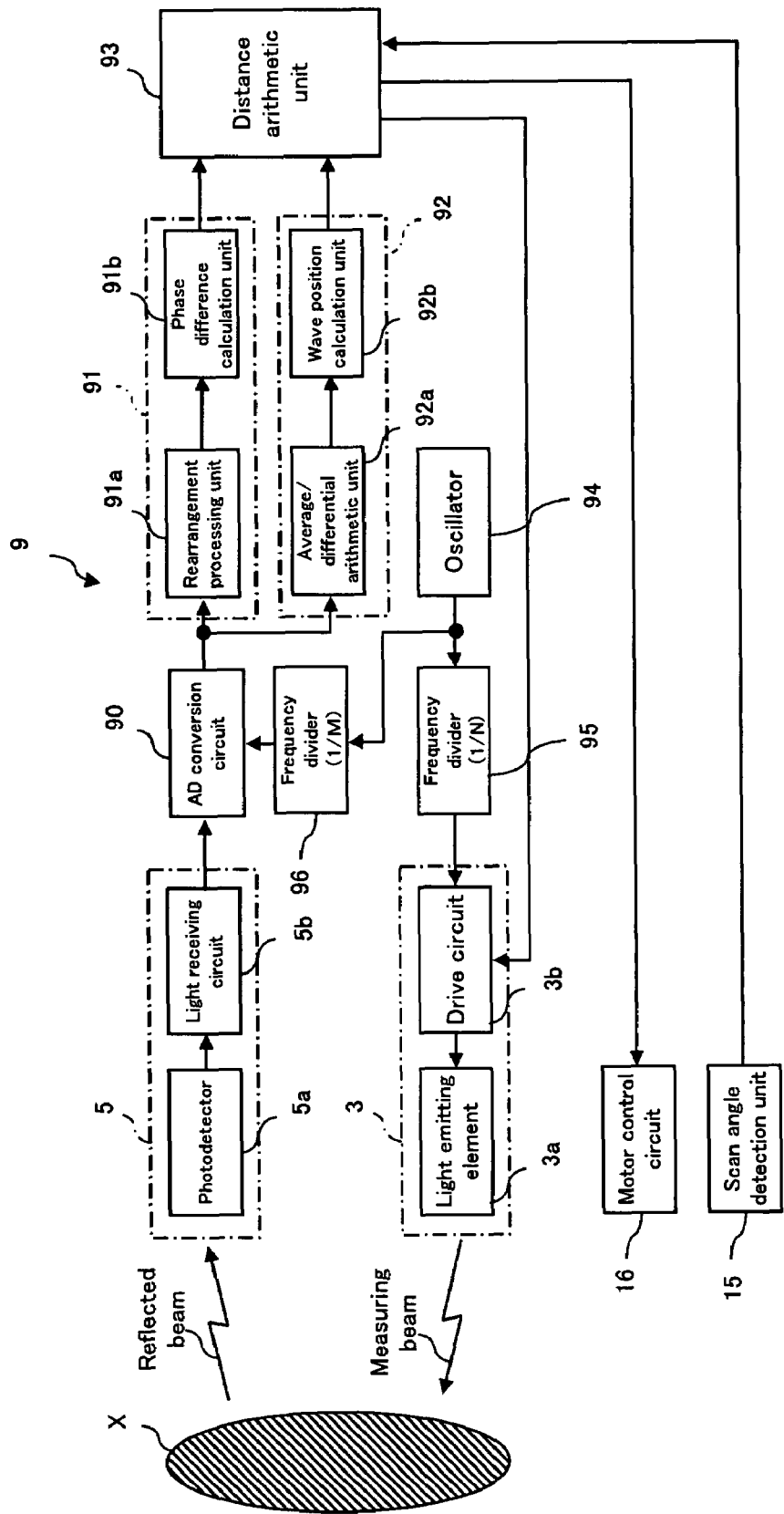
FIG. 2 is a block diagram of a signal processing circuit of the rangefinder according to the present invention.

Hereafter, a signal processing circuit constructed on the signal processing board 9 will be described in detail. The signal processing circuit is constructed to have the following, as shown in FIG. 2: the drive circuit 3b consisting of a burst drive unit for pulse-driving the light source 3a to operate in burst emission and an AM modulation unit for AM modulating the emitted measuring beam with a modulation signal consisting of a sinusoidal wave; the light receiving circuit 5b for amplifying a reflection signal that is the reflected beam subjected to photoelectric exchange at the photodetector 5a; an oscillator 94 for generating a reference clock; an AD conversion unit 90 for converting an analog reflection signal amplified by the light receiving circuit 5b into a digital reflection signal; a phase difference detection unit 91 for finding a phase difference between the measuring beam and the reflected beam; a wave position detection unit 92 for detecting a wave position of the sinusoidal wave based on a delay time between output of the measuring beam and detection of the reflected beam; a distance arithmetic unit 93 for calculating the distance to the measurement object based on the wave position detected by the wave position detection unit 92 and the phase difference detected by the phase difference detection unit 91; etc.

According to the above-mentioned configuration, the AM modulation unit AM modulates the measuring beam in the form of pulses outputted from the light source by the burst drive unit and irradiates it onto the measurement object, and a wave position arithmetic unit calculates the distance to the measurement object based on the delay time of the reflected beam. At this time, the wave position is found as a quotient obtained by dividing the calculated distance by the wavelength of the modulation signal by the AM modulation unit.

On the other hand, the phase difference arithmetic unit obtains the phase difference between the measuring beam and the reflected beam. Based on the phase difference, the distance arithmetic unit calculates a tentative distance to the measurement object as within one wavelength of the modulation signal. An accurate distance to the measurement object is calculated by adding a distance corresponding to the wave position found by the wave position arithmetic unit to the obtained tentative distance.

That is, even when the distance to the measurement object exceeds one wavelength of the modulation signal, an accurate distance will be able to be calculated with the help of the wave position found by the wave position arithmetic unit.

The distance arithmetic unit 93 is constructed to have a microcomputer and its peripheral circuit, and is configured to control the whole system. A motor control circuit 16 for driving the motor 11 and the scan angle detection unit 15 are connected with the distance arithmetic unit 93.

When power is turned on in the system, a motor driving signal will be outputted to the motor control circuit 16 from the distance arithmetic unit 93, and the motor control circuit 16 drives the motor 11 at a predetermined speed. Being accompanied with rotation driving of the motor 11, a pulse signal outputted from the scan angle detection unit 15 is inputted into the distance arithmetic unit 93, and the distance arithmetic unit 93 grasps an output direction of the measuring beam by the scan unit 4 based on said pulse signal.

A slit plate 15a constituting the scan angle detection unit 15 is formed such that its slit spacing at a predetermined reference position of the rotating body 8, namely, at a position where the reference light is guided to the light receiving unit 5 from the above-mentioned light guiding member 7 is made different from those at other positions. Accordingly, the reference position is grasped based on the waveform of the detected pulse signal, and by counting the pulses from the reference position, a rotation angle from the reference position is calculated.

Figure 3:
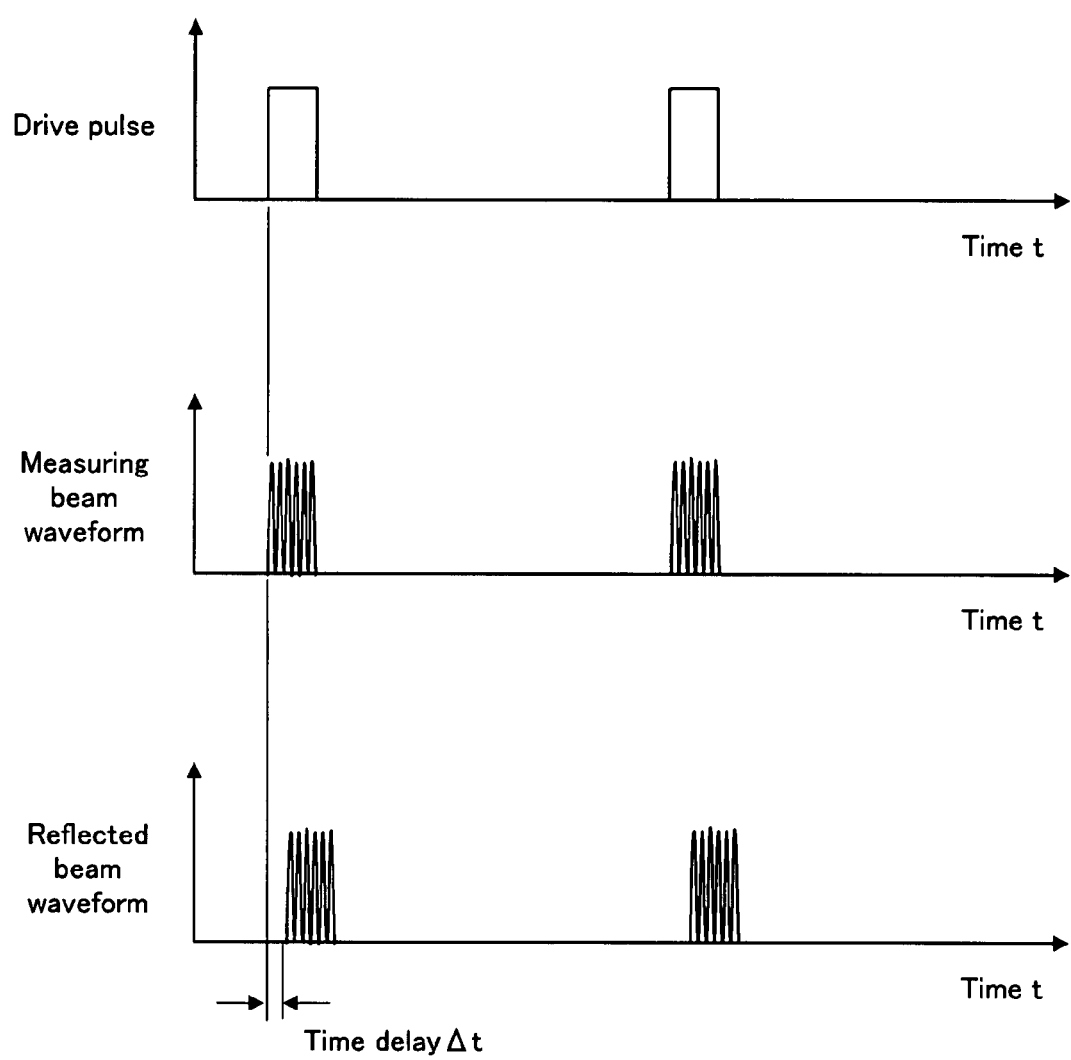
FIG. 3 is an explanatory diagram of waveforms of a measuring beam and a reflected beam.

The reference clock outputted from the oscillator 94 is divided by a frequency divider 95 in 1/N and is inputted into the drive circuit 3b, generating the modulation signal of a sinusoidal wave on the basis of the frequency division period. As shown in FIG. 3, the light source is driven to a maximum power of 200 mW for a 0.288 μs in synchronization with a drive pulse of a predetermined period, in this embodiment 18 μs, and a duty ratio of 1.6% outputted from the distance arithmetic unit 93. The measuring beam outputted from the light source is AM modulated with the modulation signal and is outputted.

That is, the measuring beam is irradiated to the measurement object space as burst light that is an AM modulated sinusoidal wave. The light receiving unit 5 detects the reflected beam from the measurement object that is delayed by a propagation time of light compared to the measuring beam and has a shifted phase. The AD conversion unit 90 analog-to-digital converts the reflection signal based on a sampling signal that is an output produced by a frequency divider 96 for dividing the reference clock outputted from the oscillator 94 into 1/M.

In order to realize a detection distance of 10 m, the AM method requires the measuring beam to have a power (maximum emission output) of 200 mW or more. Then, in order to realize Class 1 of Safety Standard IEC 60825-1 that gives laser light safety requirements, the rangefinder is designed to realize Class 1 by using the measuring beam that is driven to operate in burst emission and thereby lowering an average emission output.

Figure 4:
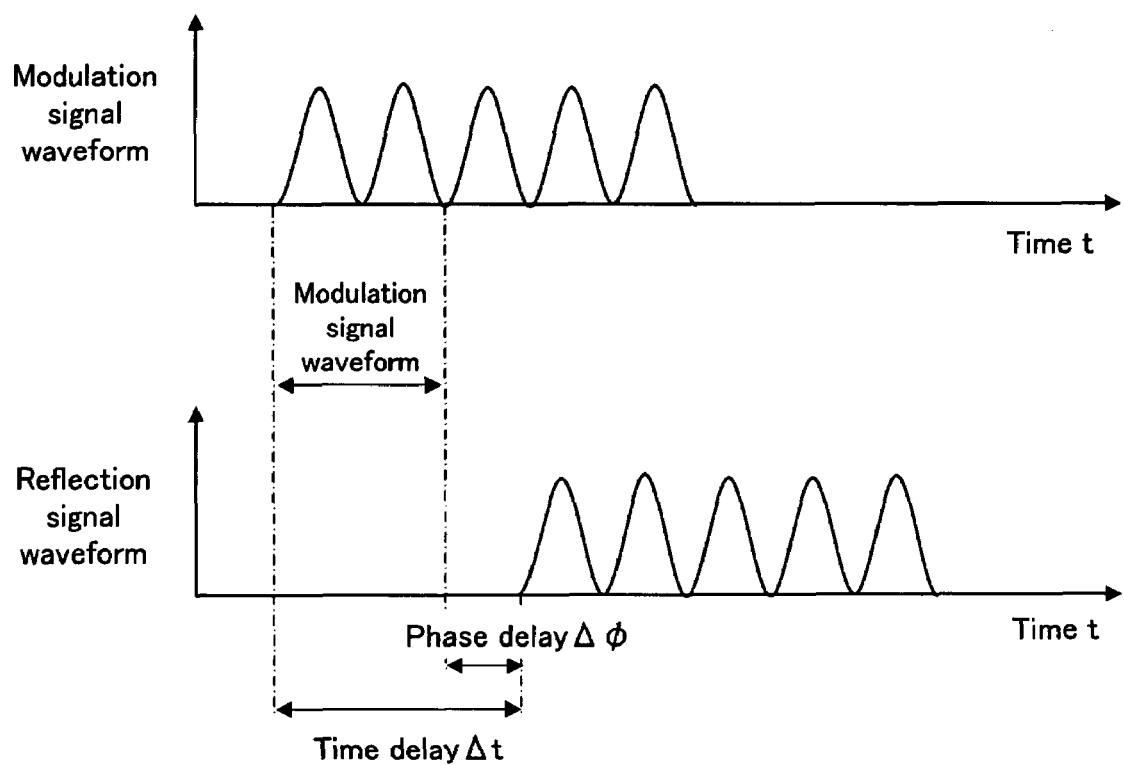
FIG. 4 is an explanatory diagram of timings of the measuring beam being irradiated onto a measurement object and of the reflected beam being reflected from the measurement object.

As shown in FIG. 4, the reflection signal detected by the light receiving unit 5 is delayed by a time $\Delta t$ from a rising edge of the modulation signal that has the same frequency and phase as those of the measuring beam and is shifted in phase by $\Delta \phi$. For example, in the case of a modulation frequency of 50 MHz, one wavelength of the signal equals to approximately 3 m. A time delay $\Delta t$ proportional to the distance shown in the figure becomes 2 waves+$\Delta \phi$. Therefore, a detection distance is calculated to be $(2+\Delta\phi/2\pi) \times 3000$ mm.

The wave position detection unit 92 detects a time delay $\Delta t$ from a rising edge timing of the drive pulse to the rising edge timing of the reflection signal, finds a distance corresponding to said time delay using the above-mentioned Formula 2 based on the time delay $\Delta t$, and calculates the wave position of the modulation signal as an integer value from a quotient obtained by dividing the distance by a wavelength of the modulation signal.

The phase difference detection unit 91 calculates a phase delay $\Delta \phi$ as within one wavelength of the reflection signal with respect to the modulation signal.

The distance arithmetic unit 93 calculates a distance corresponding to the wave position of the modulation signal detected by the wave position detection unit 92 and a distance corresponding to the phase delay $\Delta \phi$ as within one wavelength detected by the phase difference detection unit 91 respectively, and finds the distance to the measurement object from the calculated sum result.

Similarly, for the reference light, the reference distance is calculated based on the wave position of the modulation signal detected by the wave position detection unit 92 and the phase delay $\Delta \phi$ as within one wavelength detected by the phase difference detection unit 91. Incidentally, when the reference distance is smaller than the wavelength of the modulation signal, it is not necessary to detect the wave position, and a distance corresponding to the phase delay $\Delta \phi$ as within one wavelength detected by the phase difference detection unit 91 will be the reference distance.

Once every one rotation, i.e., one scan of the scan unit 4, the reference distance is calculated and the distance to the measurement object detected based on the reflected beam during next one scan is corrected based on said reference distance.

Thus, the distance from the rangefinder 100 to the measurement object and its direction are detected.

The phase difference detection unit 91 and the wave position detection unit 92 will be explained in detail below. The phase difference detection unit 91 is constructed to have a rearrangement processing unit 91a for rearranging a reflection signal value that is converted into a digital signal by the AD conversion unit 90 in time sequence and a phase difference calculation unit 91b for Fourier transforming the reflection signal that is configured by rearranging the signal value to detect its phase.

In this embodiment, the modulation signal is generated based on a clock signal of 55.5 MHz that is an output generated by the frequency divider 95 for dividing the reference clock of the oscillator 94 oscillating at a frequency of 500 MHz in 1/9 (N=9). Moreover, the AD conversion unit 90 performs AD conversion using a sampling clock of a frequency of 250 MHz that is an output generated by the frequency divider 96 for dividing the reference clock in 1/2 (M=2).

That is, the sampling signal is shifted in frequency from the modulation signal, becoming a signal that synchronizes with a specific phase of the modulation signal once every N time. Note that N is a positive integer value, and when the value of N is decreased, the number of samplings within one wavelength of the modulation signal will decrease. In this case, if the reflection signal suffers distortion due to an unstable reflected beam from the measurement object and a frequency characteristic of an amplifier, phase arithmetic may be led to a mistake. Therefore, it is preferable to adopt normally a value of eight or more.

Incidentally, if a high-speed AD converter is used, the number of samplings within one period of the reflection signal will be increased and thereby detection accuracy will be improved. However, since the high-speed AD converter is extremely expensive, it is preferable to use an AD converter with an optimal conversion speed in terms of cost and accuracy.

Figure 5:
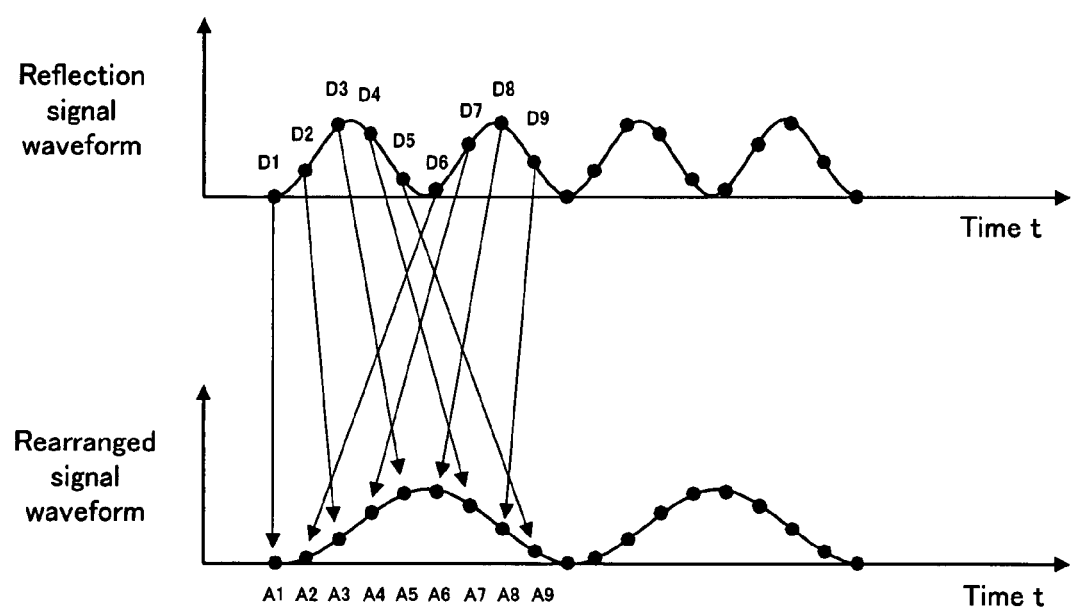
FIG. 5 is an explanatory diagram of a signal processing procedure by a phase difference detection unit.

As shown in FIG. 5, sampling timing of a frequency of 250 MHz in the AD conversion unit 90 is made to synchronize with a specific phase of the reflection signal once every nine times (in the figure, sampling point D1), and at other eight sampling timings the reflection signal waveform values are obtained as pieces of amplitude data corresponding to different specific phases within one period of the reflection signal. These pieces of amplitude data are stored in internal memory sequentially corresponding to sampling timings.

Since with nine pieces of sampling data D1, D2, ..., D9 over two periods of the reflection signal, pieces of the amplitude data having the respective phases of one period of the reflection signal can be obtained, by making the rearrangement processing unit 91a rearrange those sampling data D1, D2, ..., D9 into data A1, A2, ..., A9 in the order of corresponding phase, signal data that is down converted to 1/2 times the modulation frequency can be obtained while keeping the same phases as those of the reflection signal.

That is, when a shift of each phase of the sampling timing to the modulation signal is not 1/N times one period of the modulation signal, sinusoidal wave data that is similar to the modulation signal can be reproduced by rearranging sampled pieces of amplitude data. Incidentally, a technique related to such signal processing is described in detail in Japanese Unexamined Patent Publication No. H05-232232 (the contents of which are hereby incorporated by reference).

In this case, since the measuring beam is outputted only for a time of about 16 periods of the modulation signal, a phase 0 of the reflection signal is calculated by performing Fourier transform by applying Formula 3 to values each of which is obtained by averaging pieces of down-converted signal data over eight periods. That is, the phase difference detection unit 91 is configured to Fourier transform the digital reflection signal that is subjected to averaging processing over a plurality of frequency division periods at sampling timings for each corresponding phase in the respective period to detect the phase difference.

Therefore, since averaging processing is performed over the plurality of periods of the modulation signal for the each corresponding phase, a variation error of the detected reflection signal is absorbed and it becomes possible to obtain the phase difference accurately. Here, in Formula 3, "An" indicates an arithmetic mean value of the amplitude value corresponding to each phase.

$$\theta = \arctan \frac{\sum_{n=1}^{9} An \times \cos(2\pi n/9)}{\sum_{n=1}^{9} An \times \sin(2\pi n/9)}$$ [Formula 3]

Since according to the above-mentioned configuration, both the sampling signal and the modulation signal are generated on the basis of the reference clock from the oscillator 94 and are synchronized with each other, it is not necessary to calculate a phase of the measuring beam and the calculated phase θ is obtained just as the phase delay Δφ. Moreover, an effect caused by waveform fluctuation at the time of sampling is small, which enables high-accuracy measurement.

Figure 6:
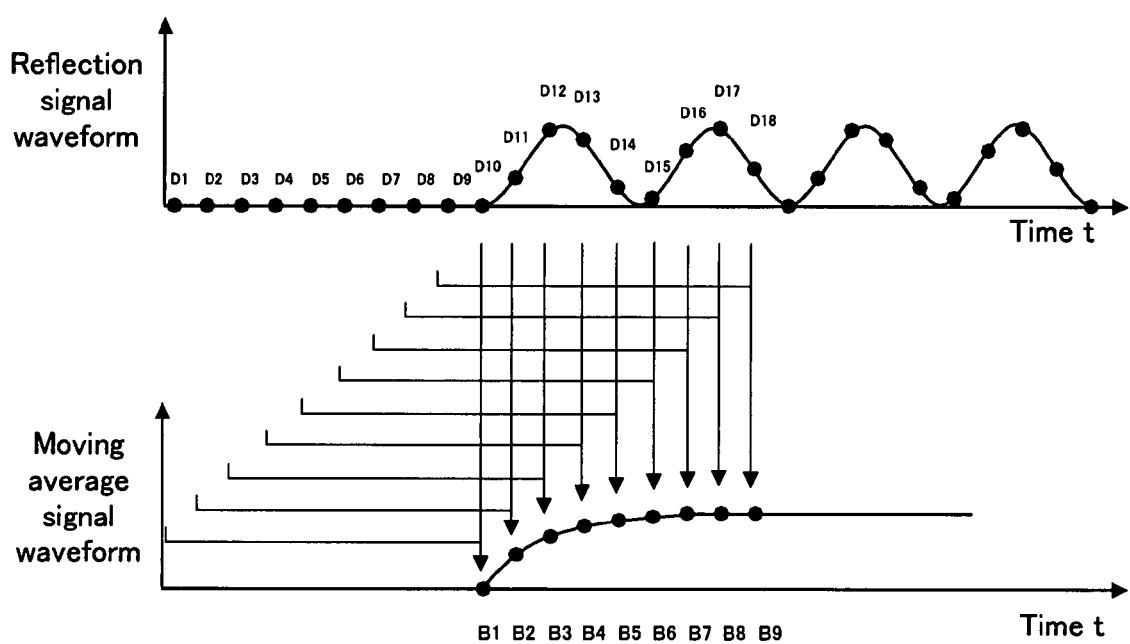
FIG. 6 is an explanatory diagram of a signal processing procedure by a wave position detection unit.
Figure 7:
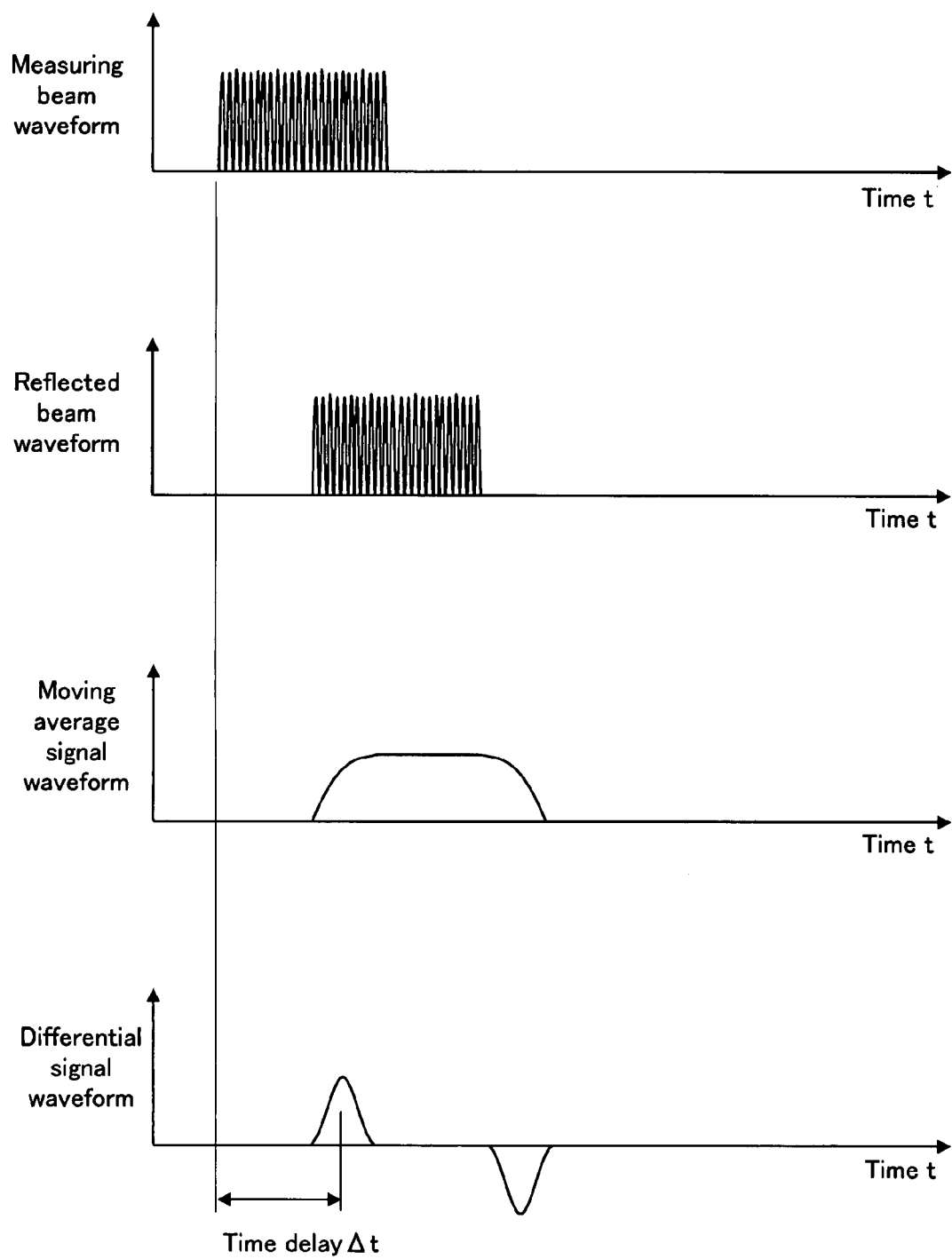
FIG. 7 is an explanatory diagram of procedures of differential calculus and of signal processing of calculating a position of the center of gravity by the wave position detection unit.

As shown in FIGS. 6 and 7, the wave position detection unit 92 is constructed to have an average/differential arithmetic unit 92a that performs differential calculus on an average waveform obtained by arranging the average values within one frequency division period for the digital reflection signal as converted by the AD conversion unit 90 while a time is shifted by one sampling timing each time to get one average value; and a wave position calculation unit 92b that calculates the wave position of the sinusoidal wave based on the timing showing a position of the center of gravity of the differential waveform obtained by the average/differential arithmetic unit 92a and an output timing of the measuring beam.

According to the above-mentioned configuration, average values for one period of the modulation signal are found while a time is shifted by one sampling timing each time to get one average value for the reflection signal being AD converted, and the average waveform is calculated by arranging the obtained average values in time sequence. Therefore, even when the rising edge timing of detected light suffers variation due to intensity of the reflected beam, a waveform with a smoothed rising edge characteristic can be obtained. Then, the position of the center of gravity of the differential waveform obtained by performing differential calculus on the average waveform like this is set as a rising edge timing of the reflected beam, whereby it becomes possible to calculate the rising edge timing accurately.

The average/differential arithmetic unit 92a, as shown in the upper part of FIG. 6, first performs processing in which, for the digital reflection signal D1, D2, ..., D9, D10, ..., D19, ... as converted by the AD conversion unit 90, moving average values of the digital reflection signals (D1, D2, ..., D9), (D10, D11, ..., D18), ... in one frequency division period are obtained while a time is shifted by one sampling timing each time to get one average value, and the moving average values thus obtained are arranged along the sampling period, whereby a moving average waveform B1, B2, ..., B9, ... is obtained, as shown in the lower part of FIG. 6.

Next, as shown in FIG. 7, differential calculus is performed on the moving average waveform, deferential edge signals ADm (m=1, 2, 3, ...) are extracted in the rising edge and the falling edge of the moving average waveform, a vertex position W of a differential edge of the extracted rising edge is found by a center-of-gravity arithmetic expression shown in Formula 4, and a time difference between the vertex position and the rising edge of the drive pulse outputted from the distance arithmetic unit 93 is calculated as time delay Δt. In Formula 4, Hm (m=1, 2, 3, ...) is a sampling time, and ADm (m=1, 2, 3, ...) is a differential signal value at that time.

$$W = \frac{\sum_m H_m \times AD_m}{\sum_m AD_m}$$ [Formula 4]

The wave position calculation unit 92b finds the wave position as a quotient obtained by dividing the found time delay Δt by the period of the modulation signal. Thus, since the wave position calculation unit 92b calculates only the wave position of the modulation signal, an accuracy of the vertex position W of the deferential edge is not required so much. To calculate the center-of-gravity arithmetic expression, an operation that targets as much number of signals as samplings of one period of the modulation frequency will suffice. However, it is preferable to target the number of sampling equal to two periods, i.e., signals at nine points.

Although in this embodiment, there was explained a method for finding a moving average waveform for the timeseries digital reflection signal as converted by the AD conversion unit 90, as explained in FIG. 5, a method whereby a moving average waveform is obtained after values of the timeseries digital reflection signal as converted by the AD conversion unit 90 are rearranged so as to form a sinusoidal wave may be adopted. This method makes the moving average waveform smoother than other methods, and accordingly an error of the wave position calculation can be controlled small.

In this method, the light receiving circuit 5b is equipped with a band pass filter with a steep filtering characteristic in order to detect a reflection signal modulated with a single modulation signal, whereby it becomes possible to eliminate noise light entering from the outside effectively.

However, in the case where another rangefinder whose measuring beam is modulated with the same modulation frequency is placed near the pertinent rangefinder, its measuring beam also passes through said band pass filter. Therefore, the following measure is taken.

In short, the wave position calculation unit 92b is further equipped with a determination unit for determining existence/absence of interference light from the outside based on the moving average waveform, from its rising edge to its falling edge.

Figure 8:
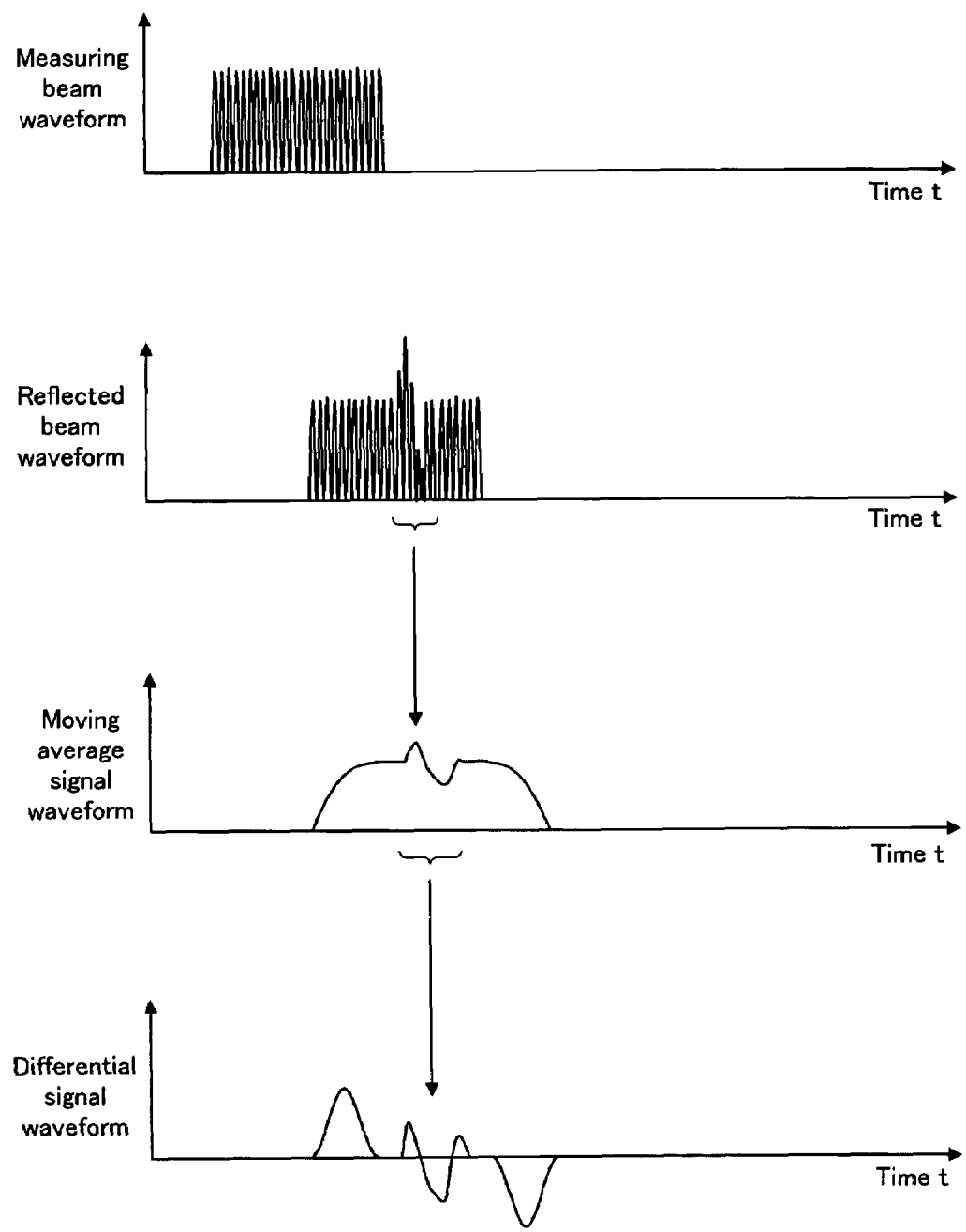
FIG. 8 is an explanatory diagram of abnormality determination processing of the reflection signal by a determination unit.
Figure 9A:
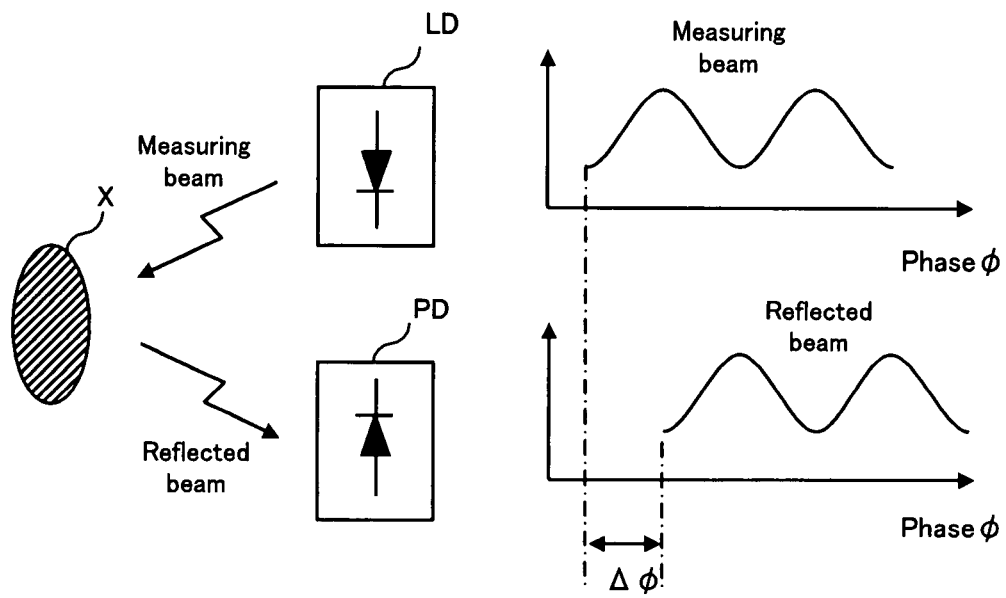
FIGS. 9A and 9B are explanatory diagrams of ranging principles of the AM method and of the TOF method.
Figure 9B:
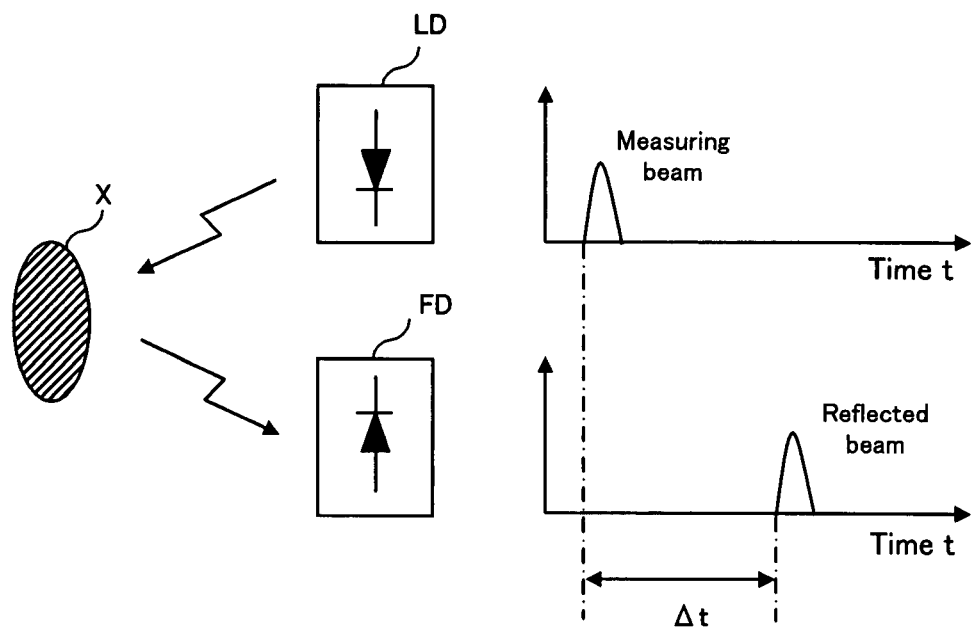

Concretely, as shown in FIG. 8, if interference light from other rangefinders mingles with the measuring beam or a position of the measurement object varies abruptly, a variation in amplitude occurs in the waveform of the reflected beam, and accordingly this causes a variation in a flat region after the rising edge of the moving average waveform. If differential calculus is performed on such a moving average waveform, edges that do not appear in the deferential waveform essentially will appear. In FIG. 8, edges being originally non-existent will be detected between the rising edge and the falling edge of the deferential waveform.

If the determination unit detects such an undesirable edge, the ranging operation of this timing will be able to be canceled by configuring the determination unit to output an error signal indicating that the detection result by the phase difference detection unit 91 is not reliable to the distance arithmetic unit 93. In this case, the rangefinder can be configured to show error indication in, for example, a display unit provided in the rangefinder.

Moreover, in the case where, if the determination unit detects such an undesirable edge, the determination unit is configured to output its detection timing in the phase difference detection unit 91, the phase difference detection unit 91 is made to perform arithmetic mean processing only on normal pieces of data that is the remainder when the data of the pertinent period is eliminated from the signal data over eight periods, on which normally averaging processing is done for each phase. By this procedure, it becomes possible to calculate the phase θ of the reflection signal without causing reduction in detection accuracy.

According to the above-mentioned configuration, when the reflected beam is affected by any disturbance, for example, by a measuring beam of a rangefinder of the same type located near the pertinent rangefinder, a conspicuous fluctuation will be found in a partial waveform from its rising edge to its falling edge of the average waveform. Accordingly, it becomes possible to effectively detect disturbance that cannot be detected by the phase difference detection unit.

The above-mentioned signal processing block of the phase difference detection unit 91 and the wave position detection unit 92 can be made up of an ASIC that is integration of a plurality of logical computing elements, and can be implemented by integrating a digital signal processor therein, if needed.

As explained above, in this embodiment, the rangefinder is enabled to realize rangefinding with a detection accuracy of approximately 7.5 mm for a detection distance of approximately 10 m.

Another embodiment will be explained below.

The oscillation frequency of the oscillator 94, the division ratio of the frequency divider 95, and the period and duty ratio of a pulse driving signal to the light source are shown just for an example, and can be altered appropriately in the design within a range where an action and an effect of the present invention can be attained. However, an experiment has cleared that in order to realize a measurement accuracy of 10 mm, a modulation signal of 50 MHz or more and the number of detection points of 60 or more are needed.

Although in the above-mentioned embodiment, the case where the present invention was applied to the scanning rangefinder was explained, but application objects of the present invention are not limited to the scanning rangefinders. No limit is imposed on the objects as long as a rangefinder falls within the rangefinder by the AM method.

It is natural that the embodiment described above is one embodiment of the present invention, and a concrete configuration of parts, such as a shape, a material, and a circuit configuration, can be altered in the design appropriately within a range where the action and effect by the present invention can be attained. For example, the following are also possible: The light receiving unit 5 is disposed on the light projection unit 3 side; a deflection mirror consisting of the first deflection mirror 9a and the second deflection mirror 9b provided in the scan unit 4 is made up of a singe deflection mirror; and an optical system for guiding the reflected beam to the light receiving unit 5 is provided.

What is claimed is:

1. A rangefinder for finding a distance to a measurement object based on a measuring beam and a reflected beam reflected from the measurement object, comprising:
    a light source for outputting the measuring beam;
    a burst drive unit for pulse-driving the light source to operate in burst emission;
    an AM modulation unit for AM modulating the measuring beam that is emitted by the burst drive unit with a modulation signal consisting of a sinusoidal wave;
    a light receiving unit for detecting the reflected beam that is part of the measuring beam modulated by the AM modulation unit and reflected by the measurement object;
    an AD conversion unit that converts an analog reflection signal corresponding to the reflected beam detected by the light receiving unit into a digital reflection signal with a sampling signal whose frequency is shifted from that of the modulation signal and synchronizes with a specific phase of the modulation signal once every N times;
    a phase difference detection unit for Fourier transforming the digital reflection signal as converted by the AD conversion unit to detect the phase difference between the measuring beam and the reflected beam;
    a wave position detection unit for calculating average values for the digital reflection signal as converted by the AD conversion unit within one modulation period while a time is shifted by one sampling timing each time to get one average value, performing differential calculus on an average waveform obtained by arranging the average values in time sequence, and calculating the wave position of the sinusoidal wave based on a delay time obtained based on a timing showing a position of the center of gravity of an obtained differential waveform and an output timing of the measuring beam; and
    a distance arithmetic unit for calculating the distance to the measurement object based on the wave position detected by the wave position detection unit and the phase difference detected by the phase difference detection unit.

2. The rangefinder according to claim 1, comprising:
    a determination unit that calculates average values for the digital reflection signal as converted by the AD conversion unit within one modulation period while a time is shifted by one sampling timing each time to get one average value, and determines existence/absence of disturbance based on an average waveform obtained by arranging the average values in time sequence, from its rising edge to its falling edge.

3. A rangefinder for finding a distance to a measurement object based on a measuring beam and a reflected beam reflected from the measurement object, comprising:
    a light source for outputting the measuring beam;
    a burst drive unit for pulse-driving the light source to operate in burst emission;
    an AM modulation unit for AM modulating the measuring beam that is emitted by the burst drive unit with a modulation signal consisting of a sinusoidal wave;
    a light receiving unit for detecting the reflected beam that is part of the measuring beam modulated by the AM modulation unit and reflected by the measurement object;
    an AD conversion unit that converts an analog reflection signal corresponding to the reflected beam detected by the light receiving unit into a digital reflection signal with a sampling signal whose frequency is shifted from that of the modulation signal and synchronizes with a specific phase of the modulation signal once every N times;

a phase difference detection unit for detecting the phase difference between the measuring beam and the reflected beam by Fourier transforming the digital reflection signal as converted by the AD conversion unit that is subjected to averaging processing over a plurality of modulation periods at sampling timings for each corresponding phase in the respective period;

a wave position detection unit for calculating average values for the digital reflection signal as converted by the AD conversion unit within one modulation period while a time is shifted by one sampling timing each time to get one average value, performing differential calculus on an average waveform obtained by arranging the average values in time sequence, and calculating the wave position of the sinusoidal wave based on a delay time obtained based on a timing showing a position of the center of gravity of an obtained differential waveform and an output timing of the measuring beam; and a distance arithmetic unit for calculating the distance to the measurement object based on the wave position detected by the wave position detection unit and the phase difference detected by the phase difference detection unit.

4. The rangefinder according to claim 3, comprising a determination unit that calculates average values for the digital reflection signal as converted by the AD conversion unit within one modulation period while a time is shifted by one sampling timing each time to get one average value, and determines existence/absence of disturbance based on an average waveform obtained by arranging the average values in time sequence, from its rising edge to its falling edge.

* * * * *